(12) United States Patent
Sheaffer et al.

(10) Patent No.: US 8,370,577 B2
(45) Date of Patent: Feb. 5, 2013

(54) METAPHYSICALLY ADDRESSED CACHE METADATA

(75) Inventors: Gad Sheaffer, Haifa (IL); David Callahan, Seattle, WA (US); Jan Gray, Bellevue, WA (US); Ali-Reza Adl-Tabatabai, San Jose, CA (US); Shlomo Raikin, Geva Carmel (IL)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 12/493,165

(22) Filed: Jun. 26, 2009

(65) Prior Publication Data
US 2010/0332716 A1 Dec. 30, 2010

(51) Int. Cl.
G06F 12/00 (2006.01)
(52) U.S. Cl. .................. 711/118; 711/E12.001
(58) Field of Classification Search .................. 711/212, 711/211, E12.002
See application file for complete search history.

(56) References Cited

U.S. PATENT DOCUMENTS

| 4,442,487 | A | 4/1984 | Fletcher |
| 5,394,555 | A | 2/1995 | Hunter |
| 5,404,555 | A | 4/1995 | Liu |
| 5,428,761 | A | 6/1995 | Herlihy et al. |
| 5,768,500 | A | 6/1998 | Agrawal |
| 5,835,764 | A | 11/1998 | Platt |
| 6,314,563 | B1 | 11/2001 | Agensen |
| 6,665,704 | B1 | 12/2003 | Singh |
| 6,751,617 | B1 | 6/2004 | Anfindsen |
| 6,842,830 | B2 | 1/2005 | Khare |
| 6,845,430 | B2 | 1/2005 | Hopeman |
| 6,862,635 | B1 | 3/2005 | Alverson |
| 6,871,264 | B2 | 3/2005 | Soltis |
| 6,898,609 | B2 | 5/2005 | Kerwin |
| 6,938,128 | B1 | 8/2005 | Kuskin et al. |
| 6,976,155 | B2 | 12/2005 | Drysdale |
| 7,111,294 | B2 | 9/2006 | Steensgaard |
| 7,127,561 | B2 | 10/2006 | Hill |
| 7,162,512 | B1 | 1/2007 | Amit |
| 7,181,578 | B1 | 2/2007 | Guha |
| 7,210,145 | B2 | 4/2007 | Srinivasan |
| 7,213,106 | B1 | 5/2007 | Koster |
| 7,246,123 | B2 | 7/2007 | Carr |
| 7,320,065 | B2 | 1/2008 | Gosior |
| 7,376,800 | B1 | 5/2008 | Choquette |
| 7,395,382 | B1 | 7/2008 | Moir |
| 7,406,698 | B2 | 7/2008 | Richardson |

(Continued)

OTHER PUBLICATIONS

U.S. Appl. No. 12/495,582, filed Jun. 30, 2009, Gray.

(Continued)

*Primary Examiner* — Kevin Verbrugge
(74) *Attorney, Agent, or Firm* — Workman Nydegger

(57) ABSTRACT

Storing metadata that is disjoint from corresponding data by storing the metadata to the same address as the corresponding data but in a different address space. A metadata store instruction includes a storage address for the metadata. The storage address is the same address as that for data corresponding to the metadata, but the storage address when used for the metadata is implemented in a metadata address space while the storage address, when used for the corresponding data is implemented in a different data address space. As a result of executing the metadata store instruction, the metadata is stored at the storage address. A metadata load instruction includes the storage address for the metadata. As a result of executing the metadata load instruction, the metadata stored at the address is received. Some embodiments may further implement a metadata clear instruction which clears any entries in the metadata address space.

17 Claims, 3 Drawing Sheets

U.S. PATENT DOCUMENTS

| | | | |
|---|---|---|---|
| 7,467,323 | B2 | 12/2008 | Fields, Jr. |
| 7,478,210 | B2 | 1/2009 | Saha |
| 7,502,897 | B2 | 3/2009 | Hertzberg |
| 7,512,636 | B2 | 3/2009 | Verma |
| 7,516,366 | B2 | 4/2009 | Lev |
| 7,584,232 | B2 | 9/2009 | Guo |
| 7,711,909 | B1 | 5/2010 | Lev et al. |
| 8,095,824 | B2 | 1/2012 | Gray |
| 2003/0188300 | A1 | 10/2003 | Patrudu |
| 2004/0243868 | A1 | 12/2004 | Toll et al. |
| 2005/0060495 | A1* | 3/2005 | Pistoulet ............... 711/118 |
| 2005/0246487 | A1* | 11/2005 | Ergan et al. ............. 711/113 |
| 2006/0085591 | A1 | 4/2006 | Kumar |
| 2007/0143287 | A1 | 6/2007 | Adi-Tabatabai |
| 2007/0143741 | A1 | 6/2007 | Harris |
| 2007/0156780 | A1 | 7/2007 | Saha |
| 2007/0156994 | A1 | 7/2007 | Akkary |
| 2007/0198792 | A1 | 8/2007 | Dice |
| 2007/0198979 | A1 | 8/2007 | Dice |
| 2007/0239943 | A1 | 10/2007 | Dice |
| 2007/0245099 | A1 | 10/2007 | Gray |
| 2007/0245128 | A1 | 10/2007 | Gray |
| 2007/0260608 | A1 | 11/2007 | Hertzberg |
| 2007/0260942 | A1 | 11/2007 | Rajwar |
| 2008/0021934 | A1 | 1/2008 | Hudson |
| 2008/0040551 | A1 | 2/2008 | Gray |
| 2008/0127035 | A1 | 5/2008 | Lev |
| 2008/0162886 | A1 | 7/2008 | Saha |
| 2008/0163220 | A1 | 7/2008 | Wang |
| 2008/0270745 | A1 | 10/2008 | Saha |
| 2009/0006407 | A1 | 1/2009 | Magruder |
| 2009/0006467 | A1 | 1/2009 | Visscher |
| 2009/0006751 | A1 | 1/2009 | Taillefer |
| 2009/0006767 | A1 | 1/2009 | Saha |
| 2009/0007119 | A1 | 1/2009 | Blumrich |
| 2009/0019231 | A1 | 1/2009 | Cypher |
| 2009/0063780 | A1 | 3/2009 | Terechko |
| 2009/0089520 | A1 | 4/2009 | Saha |
| 2009/0113443 | A1 | 4/2009 | Heller |
| 2009/0165006 | A1 | 6/2009 | Ceze |
| 2009/0172292 | A1 | 7/2009 | Saha |
| 2009/0172303 | A1 | 7/2009 | Welc |
| 2009/0172305 | A1 | 7/2009 | Shpeisman |
| 2009/0172306 | A1 | 7/2009 | Nussbaum |
| 2009/0172654 | A1 | 7/2009 | Zhao |
| 2009/0204969 | A1 | 8/2009 | Abadi |
| 2009/0235237 | A1 | 9/2009 | Song et al. |
| 2009/0235262 | A1 | 9/2009 | Ceze et al. |
| 2009/0260011 | A1 | 10/2009 | Snover |
| 2010/0131953 | A1 | 5/2010 | Dice |
| 2010/0162249 | A1 | 6/2010 | Shpeisman |
| 2010/0169382 | A1 | 7/2010 | Sheaffer |
| 2010/0169579 | A1 | 7/2010 | Sheaffer |
| 2010/0169580 | A1 | 7/2010 | Sheaffer |
| 2010/0229043 | A1 | 9/2010 | Saha |
| 2010/0325630 | A1 | 12/2010 | Flood |
| 2011/0145304 | A1 | 6/2011 | Gray |
| 2011/0145498 | A1 | 6/2011 | Taillefer |
| 2011/0145553 | A1 | 6/2011 | Levanoni |
| 2011/0145802 | A1 | 6/2011 | Levanoni |

OTHER PUBLICATIONS

Ananian; "Unbounded Transactional Memory"; 2009; pp. 1-12; http://supertech.csail.mit.edu/papers/xaction.ps.
Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.
Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.
Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.
Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.
Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.
Moravan; "Supporting Nested Transactional Memory in LogTM"; Oct. 21-25, 2006; pp. 1-12; http://www.cs.wisc.edu/multifacet/papers/asplos06_nested_logtm.pdf.
Author Unknown; "Extending Hardware Transactional Memory to Support Non-Busy Waiting and Non-Transactional Actions"; 2006; pp. 1-19; http://209.85.229.132/search?q=cache:-9KSLEk_CcIJ:www.cs.purdue.edu/homes/jv/events/TRANSACT/slides/zilles.pdf+non-transactional+instructions+and+abort&cd=3&hl=en&ct=clnk&gl=in.
Carlstrom; "The ATOMOΣ Transactional Programming Language"; Jun. 11-16, 2006; pp. 1-13; http://tcc.stanford.edu/publications/tcc_pldi2006.pdf.
Moss; "Open Nested Transactions"; Semantics and Support; 2006; pp. 1-8; http://www.cs.utah.edu/wmpi/2006/final-version/wmpi-posters-1-Moss.pdf.
Minh; "An Effective Hybrid Transactional Memory System with Strong Isolation Guarantees"; Jun. 9-13, 2007; pp. 1-12; http://tcc.stanford.edu/publications/tcc_isca2007.pdf.
Chong; "Scalable HMM based Inference Engine in LVCSR"; Mar. 31, 2009; 1 page; http://www.icsi.berkeley.edu/cgi-bin/events/event.pl?ID=000531.
Zeichick; "Massive Multi-Core Processors: The Gamer's Edge"; Oct. 4, 2007; pp. 1-2; http://developer.amd.com/documentation/articles/Pages/1042007177.aspx.
Vasantharam; "CSMP"; 2009; pp. 1-3; http://sourceforge.net/projects/mupisoft/.
Bracy; "Disintermediated Active Communication"—Nov. 9, 2006—pp. 1-4—http://ieeexplore.ieee.org/stamp/stamp.jsp?arnumber=04069172.
Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.
Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.
Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.
Lilja; "Cache Coherence in Large-Scale Shared Memory Multiprocessors: Issues and Comparisons"—Sep. 1993—pp. 1-43—http://www.arctic.umn.edu/papers/coherence-survey.pdf.
Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.
Papamarcos; "A Low-Overhead Coherence Solution for Multiprocessors with Private Cache Memories"—1984—pp. 348-354—http://www.csl.cornell.edu/courses/ece572/papamarcos.isca84.pdf.
Chuang; "Unbounded Page-Based Transactional Memory"—Oct. 21-25, 2006—pp. 1-12—http://www.cse.ucsd.edu/~wchuang/ASPLOS-06-PTM.pdf.
Swift; "OS Support for Virtualizing Hardware Transactional Memory"—2008—pp. 1-10—http://www.cs.wise.edu/multifacet/papers/transact08_tvm.pdf.
Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.
Andrew; "A Dictionary of HTML META Tags"—Feb. 11, 2007—pp. 1-11—http://vancouver-webpages.com/META/metatags.detail.html.
Spear; "Implementing and Exploiting Inevitability in Software Transactional Memory"—2008—pp. 59-66—http://ieeexplore.ieee.org/stamp/stamp.jsp?arnumber=04625833.

Author Unknown; Wikipedia; "Software Transactional Memory"—May 7, 2009—pp. 1-7—http://en.wikipedia.org/wiki/Software_transactional_memory.

Office Action dated Oct. 4, 2011 cited in U.S. Appl. No. 12/495,582.

Notice of Allowance dated Nov. 28, 2011 cited in U.S. Appl. No. 12/493,163.

Zilles et al. "Extending Hardware Transactional Memory to Support Non-busy Waiting and Non-transactional Actions," Nov. 2006, pp. 1-10.

Joao; "Flexible Reference-Counting-Based Hardware Acceleration for Garbage Collection"—Published Jun. 20-24, 2009 pp. 1-11.

Grossman; "The Transactional Memory/Garbage Collection Analogy"—Published Oct. 21-25, 2007—pp. 1-12.

Adl-Tabatabai; "Unlocking Concurrency"—Published Dec./Jan. 2006-2007 pp. 25-33.

Carlstrom; "Executing Java Programs with Transactional Memory"—Published Mar. 26, 2007 pp. 1-32.

Diestelhorst—"Hardware Acceleration for lock-free data structures and software-transactional memory"—Published Aug. 14, 2008 pp. 1-8.

Harizopoulos—"Steps towards cache-resident transaction processing"—Published 2004 pp. 1-12.

Lie—"Hardware Support for Unbounded Transactional Memory"—Published May 7, 2004 pp. 1-111.

Saha—"Architectural Support for Software Transactional Memory"—Published 2006 pp. 1-12.

Volos—"NePalTM: Design and Implementation of Nested Parallelism for Transactional Memory"—Published 2009, pp. 1-25.

Rothermel—"Concurrency Control Issues in Nested Transactions"—Published 1992, pp. 1-36.

Author Unknown—".NET Framework 4 Beta 1 enabled to use Software Transactional Memory (STM.NET Version 1.0)"—Published Jul. 24, 2009; pp. 1-84.

Nyte—"Nesting Models in Software Transactional Memory"—Published Sep. 14, 2007; pp. 1-3.

Agrawal—"Nested parallelism in transactional memory"—Published 2008; pp. 163-174.

Bobba—"Performance Pathologies in Hardware Transactional Memory"—Published 2007; pp. 1-11.

Author Unknown—"Hw-breakpoint: shared debugging registers"—Published Sep. 16, 2009; pp. 1-3.

Scherer—"Contention Management in Dynamic Software Transactional Memory"—Published Apr. 2004; pp. 1-10.

Curnow—"An Embedded Processor Architecture with Extensive Support for SoC Debug"—Retrieved Jun. 11, 2010; pp. 1-5.

Office Action dated Jan. 20, 2012 cited in U.S. Appl. No. 12/493,167.

Office Action dated Feb. 3, 2012 cited in U.S. Appl. No. 12/493,164.

Notice of Allowance dated Feb. 21, 2012 cited in U.S. Appl. No. 12/493,161.

Office Action dated Aug. 20, 2012 cited in U.S. Appl. No. 12/638,929.

Office Action dated Aug. 16, 2012 cited in U.S. Appl. No. 12/493,164.

Office Action dated Apr. 4, 2012 cited in U.S. Appl. No. 12/638,929.

Office Action dated Mar. 29, 2012 cited in U.S. Appl. No. 12/493,168.

Office Action dated Mar. 16, 2012 cited in U.S. Appl. No. 12/493,162.

Notice of Allowance dated Mar. 14, 2012 cited in U.S. Appl. No. 12/495,582.

Notice of Allowance dated Apr. 9, 2012 cited in U.S. Appl. No. 12/493,161.

Office Action dated Oct. 5, 2012 cited in U.S. Appl. No. 12/493,167 (Copy Attached).

Notice of Allowance dated Sep. 13, 2012 cited in U.S. Appl. No. 12/493,168 (Copy Attached).

Office Action dated Oct. 24, 2012 cited in U.S. Appl. No. 12/493,162 (Copy Attached).

Notice of Allowance dated Nov. 29, 2012 cited in U.S. Appl. No. 12/638,929 (Copy Attached).

Harris et al., "Abstract Nested Transactions", Aug. 2007 CiteSeerX, http://citeseer.ist.psu.edu/viewdoc/summary? doi=10.1.1.126.3885, pp. 1-10.

Office Action dated Dec. 07, 2012 cited in U.S. Appl. No. 12/638,103 (Copy Attached).

* cited by examiner

METAPHYSICALLY ADDRESSED CACHE METADATA

CROSS-REFERENCE TO RELATED APPLICATIONS

This application is related to U.S. patent application Ser. No. 12/493,167, filed Jun. 26, 2009, and entitled "PERFORMING ESCAPE ACTIONS IN TRANSACTIONS", as well as U.S. application Ser. No. 12/493,163, filed Jun. 26, 2009, and entitled "WAIT LOSS SYNCHRONIZATION", as well as U.S. application Ser. No. 12/493,162, filed Jun. 26, 2009, and entitled "FLEXIBLE READ- AND WRITE-MONITORED AND BUFFERED MEMORY BLOCKS", as well as U.S. application Ser. No. 12/493,164, filed Jun. 26, 2009, and entitled "PRIVATE MEMORY REGIONS AND COHERENCE OPTIMIZATIONS", as well as U.S. application Ser. No. 12/493,161, filed Jun. 26, 2009, and entitled "OPERATING SYSTEM VIRTUAL MEMORY MANAGEMENT FOR HARDWARE TRANSACTIONAL MEMORY", as well as U.S. application Ser. No. 12/493,168, filed Jun. 26, 2009, and entitled "MINIMIZING CODE DUPLICATION IN AN UNBOUNDED TRANSACTIONAL MEMORY". All of the foregoing applications are being filed concurrently herewith and are incorporated herein by reference.

BACKGROUND

Background and Relevant Art

Computers and computing systems have affected nearly every aspect of modern living. Computers are generally involved in work, recreation, healthcare, transportation, entertainment, household management, etc.

One key part of computing software is a 1:1 mapping function from a key to a value, e.g. mapping from one datum or address, to another datum or address, is a commonly used data abstraction used in software. The map abstraction can be implemented in software in many ways, such as a linear search table lookup, or various flavors of hash tables. A common use of a map data structure is to associate optional, context-dependent, additional data or properties with data at some address. Herein we call this additional state, the metadata for the data.

In certain applications such as software transactional memory (STM), the data footprint and code sequence required to map a datum's address to its metadata address is too expensive given the very high frequency of such mappings. In STM each thread may be running a transaction that accesses the same data, and STM algorithms need to repeatedly map the address of any data accessed in that thread's transaction to its (thread-specific) metadata. This typically requires a per-thread off-to-the-side associative map data structure such as a hash table. Maintaining and accessing this structure may be slow and may churn the memory hierarchy including any data caches.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments are directed to storing metadata that is disjoint from corresponding data by storing the metadata to the same address as the corresponding data but in a different address space. Some embodiments include functionality for implementing a new store instruction which includes the ability to store the metadata. Thus, a metadata store instruction may be executed. The metadata store instruction includes a storage address for the metadata. The storage address is the same address as that for data corresponding to the metadata, but the storage address when used for the metadata is implemented in a metadata address space while the storage address, when used for the corresponding data is implemented in a different data address space. The metadata storage instruction also includes metadata to be stored at the address. As a result of executing the metadata store instruction, the metadata is stored at the storage address and the ordinary data at that same address is not affected. A metadata load instruction may also be executed. The metadata load instruction includes the storage address for the metadata and the corresponding data. As a result of executing the metadata load instruction, the metadata stored at the address is received. Some embodiments may further include a metadata clear instruction which clears any entries in the metadata address space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments allow metadata about data to be stored and loaded at the same physical address as the data, but in a metadata address space different from a data address space that stores the data corresponding to the metadata. This can have the advantage of being able to eliminate expensive mapping tables and pointers needed to correlate data at one address to its corresponding metadata at a different address. Rather, to access metadata, an access metadata instruction (e.g. load metadata or store metadata), instead of a conventional data access instruction, is issued for the same address for the corresponding data. In particular, processor hardware may differ from conventional processor hardware by including a specialized instruction set architecture which includes specialized instructions for accessing or managing metadata. These specialized instructions may interact with specialized cache state machines and logic to make specialized accesses that make entries to store metadata in a cache where the same cache may also store the underlying data.

As noted, embodiments may be implemented by using a data cache. In particular, a data cache allows a copy of data from a physical address location of system memory to be stored locally (e.g. local to a die, a processor, or a thread) in memory accessed faster than system memory, such as system virtual and/or physical memory, and to be assigned the physical address in the cache. This can be leveraged to allow cache to store metadata for data at the same address as the data by using specialized metadata access instructions. In particular, the ability to have several different storage devices that can have the same address facilitates the ability to store and retrieve different data at the same physical address. Storing metadata at the same address as the corresponding data may be referred to herein as metaphysically addressing metadata.

Interestingly, some embodiments allow for a nearly limitless amount of storage locations to store metadata while not requiring any actual physical and/or virtual memory from a system. Note that while cache memory is physically a memory device, as used herein simply by definition it is not part of the physical or virtual memory of the computing system, where physical and virtual memory of a computing system typically includes semiconductor memory modules and hard drive or flash drive storage.

Additionally, some embodiments allow the metadata to be kept private to a thread or set of threads by storing the metadata on a per thread, per processor, per cache, per die basis, or at some other level of granularity. In a particular example, different threads may simultaneously access (store and/or load) different metadata for the same corresponding data and at the same physical address as the data without one thread observing the other thread's metadata.

Figure 1:
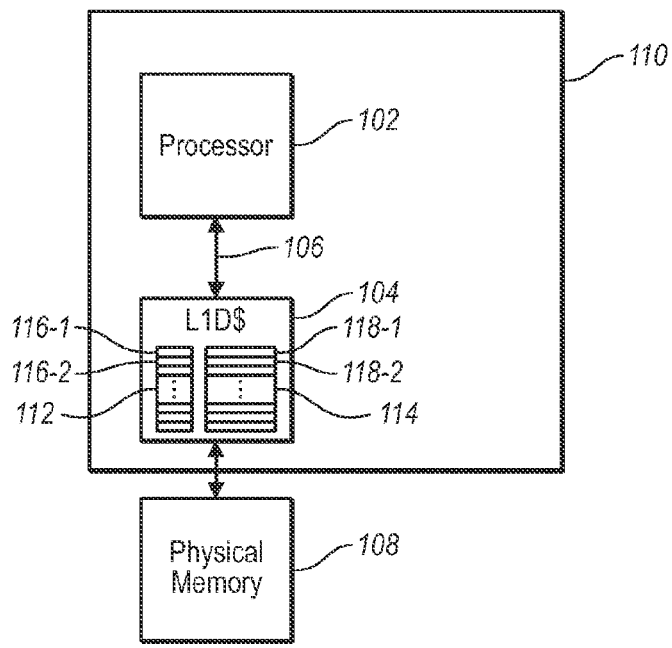
FIG. 1 illustrates a memory hierarchy.

A simple example for a single thread is illustrated by reference to FIG. 1. Multi thread and multi processor examples will be illustrated in more detail below. FIG. 1 illustrate a processor 102 coupled to a level 1 data cache (L1D$) 104 by a bus 106. The L1D$ 104 is operatively coupled to physical memory 108. Typically, the L1D$ 104 and the processor are formed on the same semiconductor die 110, or at least in the same chip package. Additionally L1D$ 104 is much smaller and uses a type of memory that is much faster than physical memory 108. As a result, communications between the processor 102 and the L1D$ 104 are very fast as compared to communication between a processor 102 and external physical memory 108. However, L1D$ 104 is typically much smaller in capacity when compared to the physical memory 108. Thus, to increase system performance, recently used or often used data is stored in the L1D$ 104 and data is only fetched from physical memory 108 when needed and not found in L1D$ 104. When new data is fetched from the physical memory 108, portions of the L1D$ 104 may need to be cleared to make space for the new data. Therefore, it is typically assumed that any data in the L1D$ 104 may be evicted or invalidated at any time.

When the processor 102 executes a load instruction requesting data, a load operation is executed with respect to the L1D$ 104 using the bus 106. Execution of the load operation typically results in a physical address for the data being sent to L1D $104. The L1D$ 104 will check to see if the data requested is currently stored in the L1D$ 104. The L1D$ 104 includes a tag column 112 and a cache line data column 114. Each tag entry in tag column includes entries which correlate to lines in the data column. The entries in the tag column 112 include a physical address or subset of physical address bits for data (as well as some other flags or other indicators as will be discussed below). Corresponding cache lines in the data column 114 include the data stored at and around the physical address. Thus, the L1D$ 104 uses the address provided by the processor 102, compares the address to addresses in tag entries in the tag column 112 to determine if the L1D$ 104 has data at the specified address. If the data is present in the L1D$ 104, then the data can be directly returned to the processor 102 from the L1D$ 104. If the data is not present in the L1D$ 104, then the L1D$ 104 requests the cache line sized block of memory that contains the data from the physical memory 108 by forwarding the address provided, and then returns the data to the processor 102 and stores the data in the L1D$ at the specified address.

To store data, the processor 102 executes a store operation with respect to the L1D$ 104. The store command typically causes an address and data to be stored to be sent to the L1D$ 104. An entry of the address is made into an entry of the tag column 112 and the data is entered into the corresponding cached line of the data column 114. When there is a need to purge a line in the L1D$ 104, the data at that line can be written back to the physical memory 108 if it has not already been sent.

Of course those of skill in the art will recognize that the preceding example is a very simplified example that does not take into account aspects such as storage of multiple items in a cache line, invalidation of data in the L1D$ 104, write-through and write-back cache store policies, multi-thread and multi-core processing, multi-level caches, and other factors. However, the example is useful for illustrating generally the functionality of a memory hierarchy as used by some embodiments.

Illustrating now how metadata can be metaphysically addressed, to store metadata at the same address as the corresponding data, the processor 102 executes a specialized store metadata operation with respect to the L1D$ 104. The store metadata operation causes an address and metadata to be sent to the L1D$ 104. Additionally, an indicator that this access is a metadata access may be sent to the L1D$ 104. In one embodiment, a control line from the processor 102 to the L1D$ may be used to indicate that the access is a metadata access. However, the indicator may be, for example, a separate flag, an addition or mathematical function applied to the physical address or other indicator. An entry of the address or portion of the address is made into an entry of the tag column 112 and the metadata is entered into the corresponding line of the data column 114. Additional information may be entered into the entry of the tag column 112 to indicate that the data in the corresponding line of the data column 114 is metadata. In the present example, when there is a need to purge or repurpose a line in the L1D$ 104 containing metadata, the metadata stored at that line, rather than being sent back to the physical memory 108, is simply invalidated and lost. This is done in this embodiment, because the metadata is only applicable to the processor 102 and not to other threads in the system.

To retrieve metadata, the processor 102 executes a specialized load metadata operation with respect to the L1D$ 104 using the bus 106. The load operation typically causes a physical address for the data to be sent to L1D$ 104. Additionally, execution of the load metadata operation may cause an indicator to be sent to L1D$ 104 indicating that the metadata being requested is, in fact, metadata. This indicator may be, for example, a separate flag, control line, or addition to the physical address as will be discussed in more detail below. The L1D$ 104 will check to see if the metadata requested is stored in the L1D$ 104. The L1D$ 104 uses the address provided by the processor 102, compares the address to addresses in tag entries in the tag column 112 and the additional metadata indicator in the tag column 112 to determine if the L1D$ 104 has metadata at the specified address. If the metadata is present in the L1D$ 104, then the metadata can be directly returned to the processor 102 from the L1D$ 104. If the data is not present in the L1D$ 104, then the L1D$ 104, in one example, returns a value anyway, such as zero. Additionally, if a zero is returned, an entry may be created in the L1D$ 104 at the specified address for the metadata and the metadata in the corresponding line of the data column 114 may be initialized. For example, the metadata in the line may be initialized to all zeros, or initialized to all 1s in reverse logic system. In particular, a request for metadata may signal that it is desirable to store such metadata, and as such, if an entry does not exist for such metadata, one can be created.

Notably, metadata and data can still be stored in the same cache at the same time. In one embodiment, this is facilitated by using the indicator in a tag line in a tag column 112 indicating that a line in a data column 114 contains metadata. For example, tag lines 116-1 and 116-2 may have the same physical address, but tag line 116-2 may include an indicator that the line is for metadata. Column line 118-1 therefore contains data, while column line 118-2 contains the corresponding metadata. This example illustrates how an embodiment may be implemented using a specialized direct mapped cache.

However, embodiments may also be implemented using fully associative caches or set associative caches as will be illustrated further herein. In fully associative or set associative caches, data and its corresponding metadata can still be stored in the same cache at the same time at the same address.

Metaphysically addressed metadata is a novel mechanism to apply existing cache hardware (for example: cache tag lookup/match hardware) to directly access the metadata for a datum, as directly and efficiently as a conventional cached data load, and to allow multiple threads to each enjoy a separate view (in separate address space) on such metadata.

Embodiments may implement a new memory address space that 1:1 overlays the physically addressed data, called metaphysically addressed data. For each thread, and for each byte of physical data, there is logically a byte of thread-specific metaphysical metadata. Instead of placing metadata for a virtual address VA at some other virtual address VA2, and using a software data structure such as pointer, or off-to-the-side hash table to locate VA2, some embodiments permit the metadata for the data at VA to also be directly addressed at VA, via a family of specialized metadata instructions. In the particular illustrative embodiments illustrated herein, the specialized instructions are based on the MOV (move data instructions) commonly utilized in the instruction set architecture for many commonly available microprocessors. In particular, as illustrated herein, the new specialized instructions belong to a family of MOVMD (move metadata to/from metadata space) instructions. While these particular instructions are illustrated, it should be noted that they are only illustrated for purposes of explanation and that other instructions with similar functionality can be implemented with the scope of the embodiments claimed herein. Returning once again to the present example, instruction opcodes may differentiate a conventional data access (e.g. MOV etc.) from a metaphysical metadata access (e.g. MOVMD).

Whereas conventional data, physically or virtually addressed, resides in physical or virtual memory respectively, such as RAM and mass storage such has hard drives, flash drives, etc., and can be cached elsewhere in the memory hierarchy for quick access, metaphysically addressed metadata, in some embodiments, resides only in cache lines in the memory hierarchy. Cache lines, which traditionally cache data from RAM, are enhanced so they can cache either physical data or metaphysical metadata. In one embodiment, as noted above, this is accomplished by adding one bit of cache tag state to entries in tag lines (generally illustrated by variants of the designator 116 in FIG. 1 and referred to generically herein as simply 116) to differentiate a data line (generally illustrated by variants of 118 in FIG. 1 and referred to generically herein as simply 118) for an address from a metadata line for the same address.

While in cache, metaphysically addressed metadata can be written and read back using MOVMD instructions. But its continuity is ephemeral in nature. Metaphysically addressed metadata has no physical address and is not loaded from nor written back to system memory. On a first MOVMD read or write access, the metaphysically addressed metadata cache line 118 is initialized (e.g. zeroed). Later the metaphysically addressed metadata line 118 may be invalidated or repurposed at any moment. From the programmer's perspective, some embodiments assume that metaphysically addressed metadata can decay to an initialized state (e.g. 0) at any time. Nevertheless if there is good temporal locality of accesses to a given metaphysically addressed metadata, it is likely that no such decay will occur within a given series of metadata accesses, so use of this metadata storage mechanism may exhibit significant acceleration over a software managed mapping data structure.

The following description includes various technical details that may be helpful to a practitioner programming an example specialized computing system which includes specialized cache hierarchies and one or more specialized processors implementing a specialized instruction set architecture including instructions for handling metadata. In particular, various instructions and registers are illustrated, but should only be viewed as examples and not limiting. Similar functionality may be implemented using similar or equivalent instructions, registers, and other hardware and software.

In one embodiment, physical memory is logically divided into Metadata Blocks (some times referred to herein as "MDBLKs"). MDBLKs are addressed by addresses, but they are associated with a span of physical memory. The size of each MDBLK is denoted by MDBLK_SIZE, which, in one embodiment, is an implementation-defined power of 2 guaranteed to be $\geq 16$ bytes and $\leq 4096$ bytes. MDBLKs are naturally aligned on their size. All valid addresses A with the same value 'floor(A÷MDBLK_SIZE)' designate the same MDBLK. For each byte of data in a MDBLK, each thread has a private byte of metadata.

Hardware initializes metadata, in this example, to 0. A programmer should assume that any MDBLK full of metadata may spontaneously decay to an initialized state. In one embodiment, metadata is interpreted by software only. Software may load or store metadata for its corresponding data, or initialize (e.g. by zeroing) all of the thread's metadata across all MDBLKs. Software programmers should code software that works correctly even if every value of metadata written always (or intermittently) reads back as a string of zeros (or another initialization value). In one embodiment, once some metadata reads back as zeros, it will remain so until software changes it.

When a multi-byte value of metadata spans an MDBLK boundary, it is possible for the contents of the two distinct MDBLKs to decay to 0 independently.

In one implementation, there are two new instructions added to an instruction set architecture for a processor. The two new instructions are a move metadata instruction and a clear metadata instruction. Additionally, a CPU identification instruction can be extended to provide additional functionality.

In the following discussion, example instructions CLMD ("clear metadata") and MOVMD ("move metadata"), and modest changes to a CPU identification instruction such as the CPUID instruction are illustrated. It should be noted, that in other embodiments, other instructions or instrumentalities can be used.

A clear metadata instruction, e.g. CLMD, discards all metadata of all MDBLKs for a thread. In one embodiment all cache tag entry metadata indicators and MESI validity indicators are cleared, such as by clearing metadata indicators and setting MESI states to invalid. Clearing the metadata may be implemented iteratively for each cache line or as a flash clear. In particular, each cache line with metadata may be cleared one at a time with different cache line accesses. Operations may be performed to determine if a cache line has a metadata indicator set, and if so, the cache line may be cleared. In an alternative embodiment, using appropriate logic gating coupled to all cache lines, and in particular to a metadata indicator in each cache line, a flash clear may be performed on all cache lines containing metadata.

A move metadata instruction, e.g. MOVMD, converts the memory data address to a thread-private memory metadata address. It then loads or stores at the metadata address the byte, word, doubleword, or quadword of metadata to a register for load operations or from a register for store operations. A CPU identification instruction, such as the CPUID instruction may be extended such that detailed metadata access feature information can be queried.

Cache line evictions or invalidations may result in some or all metadata being lost for the current thread. Additionally, in some embodiments when a microprocessor disables parts of the cache in low-power conditions, some or all metadata may invalidated. Further, in one embodiment, at processor reset all MDBLKs of all threads on that processor are initialized.

Figure 2:
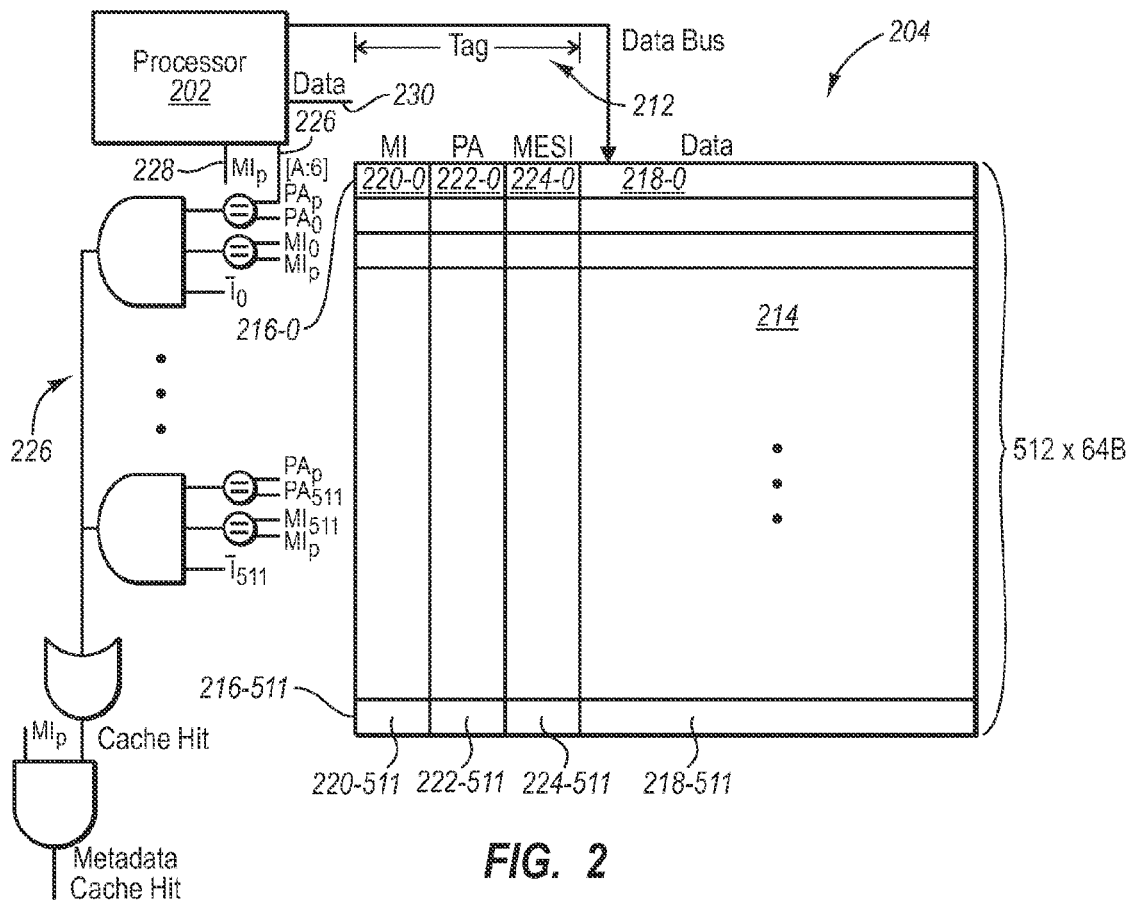
FIG. 2 illustrates a fully associative cache implementation of one embodiment.

Various hardware implementations are now illustrated. FIG. 2 illustrates additional details when one embodiment is implemented using a fully associative cache 204. A fully associative cache allows data items to be cached in any line 218 of the cache irrespective of the physical address of the data items. To determine when a cache hit occurs, various logic hardware can be included in the fully associative cache.

The fully associative data cache 204 includes a tag column 212 and a data column 204. In this example, the cache 204 is a 32 kilobyte cache including 512 64 byte data lines 218-0-218-511 (referred to generally as 218). The cache 204 also includes corresponding tag lines 216-0-216-511 (referred to generally as 216). In this example, the cache 204 is also shown as including a MESI indicator (referred to generally as 224 and specifically as some variant of 224) in each of the tag lines 216. The MESI indicator is used for implementing the Illinois MESI protocol in multiprocessor or multithread environments and indicates a state of data in a cache line. MESI stands for the modified (or dirty), exclusive, shared and invalid states respectively. Because in a cache hierarchy they may be several different copies of a particular piece of data, an indicator is used to indicate the state and sharing of data at a particular location. If the indicator indicates that the data is modified, that means that the data at that location was modified by an agent at that location (e.g. the processor 202). If the indicator indicates that data is exclusive, this means that other agents at other storage locations may not read or change their copy of the data and that the local agent (e.g. processor 202) uniquely has cached access to the data across all storage locations. If the indicator indicates that the data is shared, this means that other agents share the same version of the data. If the data is indicated as invalid, then the data at the current location in the cache is invalid and will not be used. Metadata in the cache 204 does not participate in MESI coherence. This may be accomplished by having data in the cache tagged as metadata appear invalid to MESI coherence.

To implement the ability to store metadata with corresponding data, the cache 204 also stores metadata indicator (MI) entries (referred to generally as 220 and specifically as 220-0-220-511 for $MI_0$-$MI_{511}$ respectively). Each metadata indicator entry indicates that data in a cache line 218 is metadata. This allows both metadata and corresponding data to be stored in the same cache at the same address, in different cache lines. Additionally, this allows for metadata specific instructions to be able to identify, locate, directly access, etc metadata in the cache 204 for performing operations on the metadata. For example, the MOVMD instructions and CLMD instructions can use these indicators.

FIG. 2 illustrates logic that may be used to determine if a cache hit or metadata cache hit is encountered when using a fully associative cache 204. As illustrated in FIG. 2, the processor 202 includes an address bus 226, a metadata indicator line 228 and a data bus 230. As noted, the cache 204 includes metadata indicator entries 220, physical address entries 222, and MESI entries 224. Notably, the address entries 222 may include only the most significant bits of the physical address, excluding the bottom six bits. Notably, the least significant six bits can be used to address each of the 64 bytes in the data line 218 (note that $2^6$=64). To determine if a metadata cache entry exists at a particular address, the address minus the last 6 bits, as denoted by the nomenclature PA[*:6], is compared with each tag address entry 222-0 through 222-511 (i.e. $PA_0$-$PA_{511}$) in the tag column. Each of these comparison output signals is ANDed with a comparison of the metadata indicator 228 from the processor, as illustrated by $MI_p$ and the metadata indicator in the corresponding tag line 216 as illustrated by $MI_n$, where n is the number (cache line row number) of the metadata indicator, and $\bar{I}_n$ where $I_n$ refers to the invalid state in the MESI entry 224 for a given line. The result of this ANDing indicates if a cache hit (whether it be metadata or ordinary data) is encountered. For example, a metadata cache hit would be indicated if $PA_0$ is equal to [PA:6] and $MI_p$ is equal to $MI_0$ and $I_0$ is not invalid. As shown in FIG. 2, for a fully associative cache 204, the result of such logic for each cache line is ORed such that a cache hit will be indicated if any of the cache lines meet the specified conditions. Further, the output of the ORing can be ANDed with the metadata indicator 228 from the processor which will indicate if a metadata cache hit is encountered. For example, if a cache hit is indicated, and $MI_p$ is asserted, then a metadata cache hit will be indicated.

As noted and as will be explained in more detail below, depending upon the cache implementation (e.g. fully associative, n-way set associative, direct-mapped), it may be possible for a cache line array structure to store both the data line for an address and the metaphysically addressed metadata line for the same address.

Just as cache lookup is modified to be sensitive to the metadata indicator property, so can cache line allocations, writes, etc. In some embodiments, all other memory access instructions de-assert the metadata access indicator. In the examples above, $MI_p=0$, for these accesses. For a metadata load or store instruction (e.g. a MOVMD load or store) to a cache that misses, some embodiments allocate a new initialized (e.g. zero-initialized) cache line for that metaphysically addressed metadata:

Embodiments may also be implemented using a direct mapped cache. A direct mapped cache is implemented, in one embodiment, similar to a fully associative cache, except that each cache line is reserved for specific sets of ranges of physical addresses. Thus, rather than a comparison being needed for all address lines 222 to determine if a cache hit has occurred, a single comparison can be made by fetching the cache tag data from the appropriate cache line 222 based as selected by a subset of the physical address on the address bus 226 of the processor 202 and performing the comparison. However, to determine a cache hit, logical ANDing of an address comparison, a comparison of $MI_p$ and $MI_n$, and $\bar{I}_n$ is performed. To determine a metadata cache hit, further logical ANDing of $MI_p$ to the above result is performed. In some implementations of direct mapped caches, there may be a disadvantage that data and its corresponding metadata may not be both stored in the same cache because they are stored at the same address, and inasmuch as in a direct mapped cache, a single address can be stored at only a single location, a conflict would occur between the data and corresponding metadata, which each have the same address. However, certain operations may be performed to allow a direct mapped cache to simultaneously store data and its corresponding metadata. For example, by applying a mathematical function to a physical address when $MI_p$ is asserted may allow different cache lines in the cache to be used at the same time for data and its corresponding data.

Figure 3:
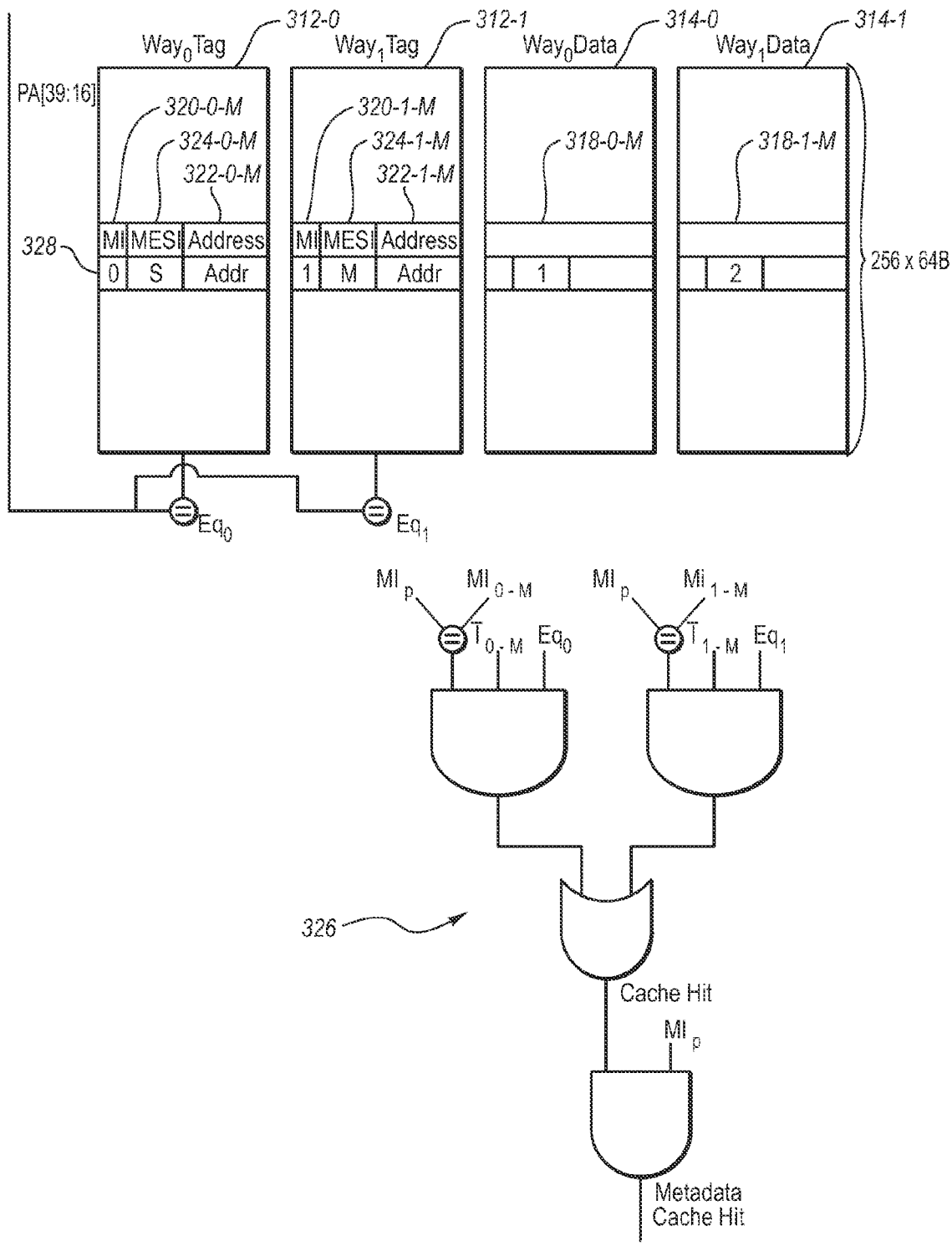
FIG. 3 illustrates 2-way associative cache implementation of one embodiment.

Another example is illustrated in FIG. 3, and illustrates a 2 way set associative cache. The 2 way example is illustrated only as one example, and it should be appreciated that the concepts illustrated can be applied to any appropriate n-way set associative cache. n-way set associative caches can be conceptualized as a hybrid between a fully associative cache and a direct mapped cache, in that n-way set associative caches have n lines in which data at a given address can be cached, rather than only a single line for each address range as is implemented in direct mapped caches or any address in any line as in a fully associative cache. As compared to the fully associative cache, hardware to determine a metadata cache hit can be reduced. For example, FIG. 3 illustrates that the metadata cache hit hardware 326 includes two AND gates and a two input OR gate, as opposed to the 512 address comparators and AND gates and a 512 input OR gate as illustrated by the metadata cache hit hardware 226. Each of the tag line entries includes a metadata indicator (referred to generally as 320), an address (referred to generally as 322) and MESI indicator (referred to generally as 324). In the attached figures, when referring to a specific metadata indicator, address or MESI indicator, additional reference may be appended to indicate a way and a line. For example, metadata indicator 320-0-M refers to the metadata indicator in $way_0$ at line M.

Using an n-way set associative cache, it is possible to cache both data and corresponding metadata at the same address. FIG. 3 illustrates an example. FIG. 3 illustrates overlapping tag columns 312-0 and 312-1 for $way_0$ and $way_1$ respectively of the 2-way cache. FIG. 3 illustrates cache lines at line M for each of the ways, $way_0$ and $way_1$. Assuming that a particular address can only be stored at set M, and that both metadata and corresponding data have the same address, data can be stored in one of the ways at set M, while the corresponding metadata is stored in the other way at set M. For example, data may be stored at the data line 318-0-M, while the corresponding metadata is stored at data line 318-1-M. In this example, the metadata indicator 320-1-M would be set to indicate that the data line 318-1-M contains metadata.

Cache line 328 illustrates a specific example. The state of the cache line 328 may be caused by executing the following assembly instructions:
MOV addr,1
MOVMD addr,2
The MOV addr,1 instruction causes the meta indicator of the $way_0$ tag to be 0 indicating that data "1" that is stored in the $way_0$ data line for an address "addr" is not metadata. The MOVMD addr,2 instruction causes the meta indicator of the $way_1$ tag to be 1 indicating that data "2" that is stored in the $way_1$ data line for an address "addr" is metadata corresponding to the data stored in the corresponding $way_0$ data line.

Some embodiments may further implement thread isolation techniques. In a most basic example, each processor implements a single core with a single thread for the core. The processor is associated with a single L1D$, such that thread, core, and processor privacy with respect to metadata stored in cache can be implemented almost inherently. However, those of skill in the art will recognize that modern computing configurations often implement multi-core processing, multi-thread per core processing and the like, where a single L1D$ may be shared amongst several different threads.

Figure 4:
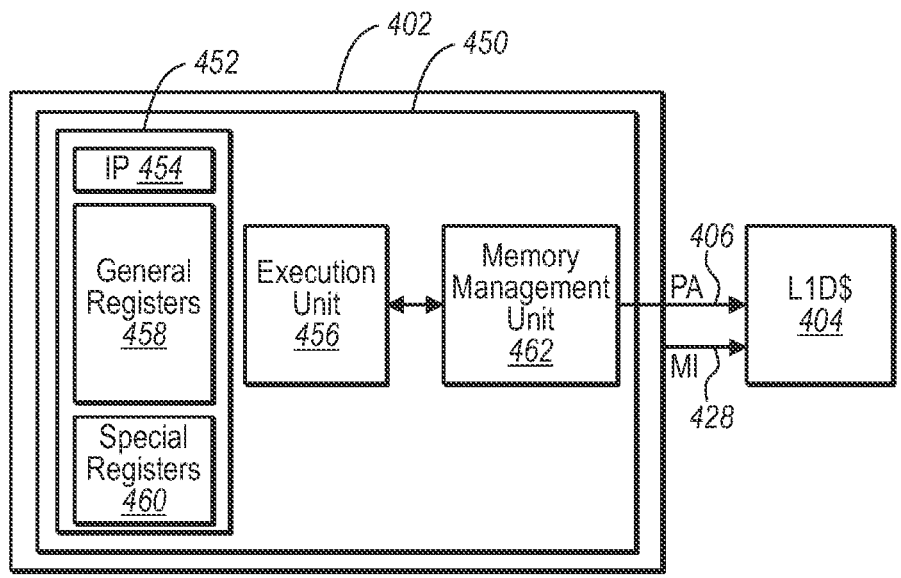
FIG. 4 illustrates a single core, single thread implementation of one embodiment.

Examples are now illustrated. FIG. 4 illustrates a basic processor configuration where a processor 402 includes a single core 450, which in turn includes a programmer visible state for a single thread state 452. The thread state 452 includes various registers. For example, the thread 452 includes an instruction pointer register 454. The instruction pointer register 454 contains an address to a next instruction to be executed by the execution unit 456 of the core 450. The thread 452 further includes general registers 458 which may store data to be operated on, and special registers 460 which may contain special flags or indicators used by the thread 452. Some embodiments may be implemented in systems with virtual memory. As shown, the execution unit may transmit a virtual address (VA) to a memory management unit 462 to request data or instructions. In one embodiment, the memory management unit 462 translates the virtual address to a physical address (PA) transmitted on an address bus 406 to the cache 404. The cache 404 can obtain the requested instruction or data locally at the physical address at the cache 404 if it is available or fetch the instruction or data from system memory. The processor 402 may also have a metadata indicator 428 that indicates to the cache 404 if the address is in the regular data space or in metadata space. Thus, in a simple case each thread has its own cache, several threads may concurrently use metadata access instructions (e.g. MOVMD instructions) to access their separate (isolated) copies of metadata in their own cache for the same physical addresses. In particular, in an implementation where each thread accesses a disjoint private cache, the separate cache line storage arrays provide a per-thread-metadata privacy abstraction.

The metadata indicator 428 may be implemented in a number of different ways. For example, the metadata indicator may be implemented as part of a metadata load or store instruction executed by a processor that causes a signal to be asserted when a processor executes a metadata load or store operation or deasserted otherwise. In an alternative embodiment, the metadata indicator 428 may be implemented as a register in the special registers 460.

However, as noted, some embodiments may be implemented where a single processor core has multiple thread contexts for minimizing idle processor time and/or where multiple cores each have one or more thread contexts, etc., and where the multiple threads are coupled to a same cache. Embodiments may nonetheless be implemented where each thread enjoys a private metaphysical address space disjoint from other threads. If multiple threads share a cache or a level of cache in the cache hierarchy, efforts can be made to preclude inadvertent sharing or comingling of metadata state between threads. This can be accomplished by adding additional processor identification state or thread identification state to the cache tag entry of a cache line and making accesses (e.g. cache entry lookups) sensitive to the processor or thread identification as well as the metadata indicator flag. Thus a processor #0 will not inadvertently access metaphysically addressed metadata for a processor #1 and so forth.

Figure 5:
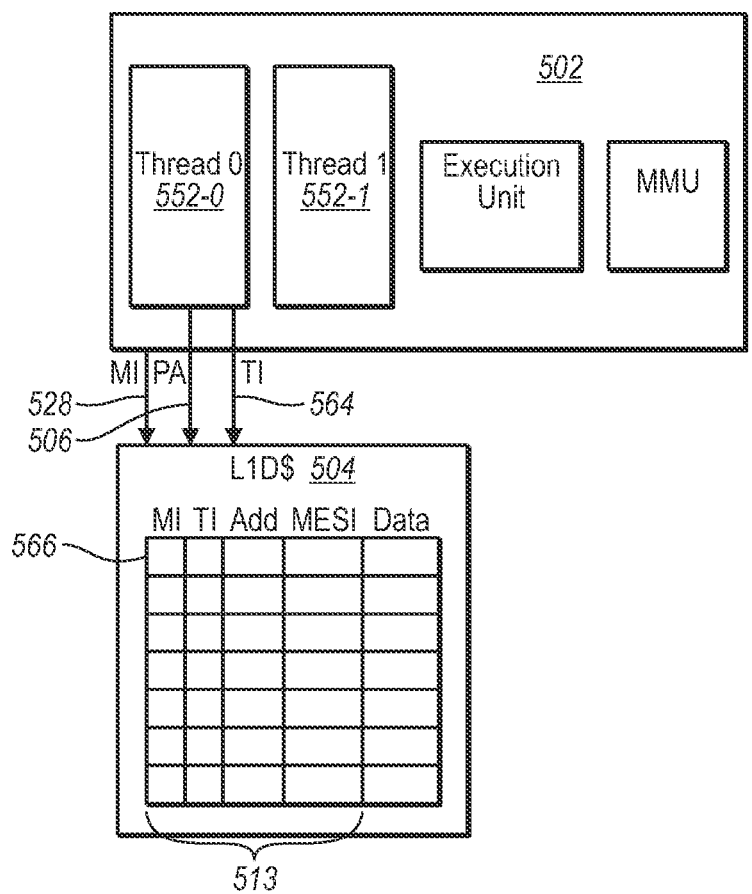
FIG. 5 illustrates a multi threaded implementation of one embodiment.

An example is illustrated in FIG. 5. FIG. 5 illustrates a processor 502, where the processor includes two threads 552-0 and 552-1. While only two threads are shown, it should be appreciated that any reasonable number of threads may be implemented. In particular, FIG. 5 illustrates that a processor implementing multiple threads may, in addition to an address bus 506 and a metadata indicator 528, also include a thread indicator 564. The thread indicator 564 includes information identifying from which thread an address and metadata indicator are coming from. Additionally, the cache 504 includes an additional thread indicator column 566 included in the tag 513. Thus, to maintain metadata state isolation, metadata access instructions are matched on address data, metadata indicator data, MESI indicator data, and thread indicator data.

Embodiments may also be implemented for accelerating transactional memory. In a software implementation of transactional memory, software manages data structures which implement conflict detection and version management of each datum accessed in a transaction. The necessary bookkeeping code sequences, inserted as read and write-barriers around the data accesses, may be dozens of instructions long. Often the same data is accessed multiple times in a transaction, and in simple software transactional memory implementations the same slow transaction memory barrier sequences are unnecessarily and redundantly executed. By associating a per-thread (per transaction) 'filter' metadata property bit with each data address, and subsequently testing the filter property before performing each barrier sequence, a significant overall speedup in the software transactional memory implementation is possible. Previously, this required a map data structure to map data addresses to different addresses for corresponding per-thread filter metadata. Unfortunately the maintenance of the per-thread filter metadata mapping is a significant overhead. However, using the principles described herein, some embodiments may be used a way to make the filter bit lookup a single instruction, rather than a code sequence to compute or lookup the filter metadata address. In particular, a single metadata load instruction using the same address as datum for which a filter property bit is being checked may be used by software to determine if a memory barrier sequence should be executed. The following illustrates an example code sequence illustrating testing the filter metadata, skipping the memory barrier sequence if the filter was already set, otherwise performing the memory barrier and setting the memory barrier metadata:

```
MOVMD EAX,A   ; load filter metadata for address A
CMP EAX,0     ; compare to 0
JNE DONE      ; if not 0, filter is set, skip barrier
...           ; filter was not set, perform long memory
...           ;    access barrier sequence
MOVMD A,1     ; set filter metadata for A to 1
DONE: ...
```

Notably, while a metadata entry in cache may be cleared or decay to 0, thus clearing the filter property, the transaction memory access still functions correctly, but rather may take a performance hit as the memory barrier sequences will be performed redundantly.

Illustrating now details of embodiments that may be implemented, embodiments may be performed in a computing environment, and include actions for software to store and load metadata for data at a virtual address using a processor with one or more metadata store and load instructions. For example, a processor may execute one or more software based metadata store instructions causing a processor to store metadata at a virtual address. The virtual address is the same address for both metadata and corresponding data to the metadata. The one or more metadata store instructions are specialized instructions particular to metadata and are different from instructions for other types of data. A processor may execute one or more software based metadata load instructions causing the metadata to be loaded from the virtual address. Similarly, the one or more metadata load instructions are specialized instructions particular to metadata and are different than instructions for other types of data. The load and store instructions may be repeated for a number of different metadata for a number of data at a number of virtual addresses. Additionally, a processor may execute one or more software based metadata clear instructions causing all metadata in a cache to be reset.

Embodiments may use these instructions to implement a map from a number of pointer keys to arbitrary values. For instance, adding to the map a mapping from a key to a value may include executing a metadata store instruction of the value to the key address. Looking-up a value for a given key may include executing a metadata load instruction of a value for the key pointer address. Clearing the map may include executing a metadata clear instruction.

Embodiments may use these instructions to implement a set of pointer keys. For instance, adding a key to the set may include executing a metadata store instruction of a non-zero value to the key address. Testing whether the set contains a key may include executing a metadata load instruction of the metadata at the key address, and comparing the loaded result against an initialized state. Clearing the set may include executing a metadata clear instruction. Some of these embodiments may be used to filter a series of computations on each of a corresponding series of possibly recurring address keys so as to avoid repeating redundant operations on recurring such keys. This may be done by: keeping a metadata based set of the keys processed so far and for each key: testing whether the set already contains the key, if the set does not contain the key, adding the key to the set and performing a computation on the key, if the set does contain the key, not performing the computation on the key. This may be done to avoid redundant computations in a series of memory access barriers on addresses in a program, to filter the memory access barrier on the address as a key. Alternatively or additionally, this may be done to avoid redundant computations in a series of transactional memory access barriers on addresses in a program, to filter the transactional memory access barrier on the address as a key.

As noted, some embodiments herein implement an ephemeral zero-fill non-write back aspect. In particular, embodiments, rather than writing metadata cache entries to higher level caches or system memory when purged, will simply purge the cache entry thus "discarding" any metadata that was written. However, alternative embodiments may be implemented. For example, as described above, thread-isolation can be accomplished if a cache structure is shared between threads by including a thread ID. Similarly, variants can write back the metadata to higher level data caches by including a thread ID and metadata indicator with the data.

While some embodiments have been described as maintaining thread privacy, other variants may share the metadata between threads. These embodiments may be particularly useable in embodiments where different threads share the same local data cache.

Some embodiments may also implement preferences when invalidating cache entries. For example, some embodiments may bias the cache line replacement algorithm in favor of cache line data in preference to metadata (or vice versa).

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for storing metadata of actual data in a cache using the same address for the metadata and the actual data, the method comprising:
   maintaining a cache associated with one or more processors, the cache comprising a plurality of cache entries, each cache entry including a data portion that stores data, and a plurality of indicators including an address indicator and a metadata indicator, the address indicator storing a representation of the physical address of the data stored in the corresponding data portion, the metadata indicator defining whether the data stored in the corresponding data portion is actual data or metadata to actual data;
   loading actual data into the cache, the actual data having a physical memory address representing the physical location in memory where the actual data is stored, the loading comprising:
      writing the actual data into the data portion of a first cache entry;
      writing a representation of the physical memory address of the actual data into the address indicator of the first cache entry; and setting the metadata indicator of the first cache entry to define that the data portion stores actual data; and
loading metadata into the cache, the metadata comprising metadata of the actual data, the loading comprising:
writing the metadata into the data portion of a second cache entry;
writing a representation of the physical memory address of the actual data to which the metadata corresponds into the address indicator of the second cache entry; and
setting the metadata indicator of the second cache entry to define that data portion stores metadata to the actual data stored at the physical memory address defined by the representation in the address indicator of the second cache entry.

2. The method of claim 1, wherein the first and second cache entries are the same cache entry in the cache.

3. The method of claim 2, wherein the cache is a direct mapping cache.

4. The method of claim 1, further comprising:
accessing the cache to determine whether the cache stores metadata for actual data stored at a given physical memory address, the accessing comprising:
reading the address indicator of each cache entry in the cache;
comparing the address indicator of each cache entry to an address indicator representing the given physical memory address; and
upon identifying a cache entry that stores the address indicator representing the given physical memory address, reading the metadata indicator to determine whether the data portion of the cache entry stores actual data or metadata to actual data.

5. The method of claim 1 wherein the loading of data into the cache is performed in response to executing a load command, and wherein the loading of metadata into the cache is performed in response to executing a metadata load command that is different than the load command.

6. The method of claim 1, further comprising clearing all metadata in the cache.

7. The method of claim 6, wherein clearing all metadata in the cache comprises writing zeros to any cache entry having the metadata indicator set.

8. The method of claim 1, wherein the cache entries each further include a thread indicator that stores an indicator of a thread associated with metadata stored in the data portion of the cache entry.

9. A computer program product comprising one or more physical storage media that store computer executable instructions which when executed perform a method for storing metadata of actual data in a cache using the same address for the metadata and the actual data, the method comprising:
maintaining a cache associated with one or more processors, the cache comprising a plurality of cache entries, each cache entry including a data portion that stores data, and a plurality of indicators including an address indicator and a metadata indicator, the address indicator storing a representation of the physical address of the data stored in the corresponding data portion, the metadata indicator defining whether the data stored in the corresponding data portion is actual data or metadata to actual data;
loading actual data into the cache, the actual data having a physical memory address representing the physical location in memory where the actual data is stored, the loading comprising:
writing the actual data into the data portion of a first cache entry;
writing a representation of the physical memory address of the actual data into the address indicator of the first cache entry; and
setting the metadata indicator of the first cache entry to define that the data portion stores actual data; and
loading metadata into the cache, the metadata comprising metadata of the actual data, the loading comprising:
writing the metadata into the data portion of a second cache entry;
writing a representation of the physical memory address of the actual data to which the metadata corresponds into the address indicator of the second cache entry; and
setting the metadata indicator of the second cache entry to define that data portion stores metadata to the actual data stored at the physical memory address defined by the representation in the address indicator of the second cache entry.

10. The computer program product of claim 9, wherein the first and second cache entries are the same cache entry in the cache.

11. The computer program product of claim 10, wherein the cache is a direct mapping cache.

12. The computer program product of claim 9, further comprising:
accessing the cache to determine whether the cache stores metadata for actual data stored at a given physical memory address, the accessing comprising:
reading the address indicator of each cache entry in the cache;
comparing the address indicator of each cache entry to an address indicator representing the given physical memory address; and
upon identifying a cache entry that stores the address indicator representing the given physical memory address, reading the metadata indicator to determine whether the data portion of the cache entry stores actual data or metadata to actual data.

13. The computer program product of claim 9, wherein the loading of data into the cache is performed in response to executing a load command, and wherein the loading of metadata into the cache is performed in response to executing a metadata load command that is different than the load command.

14. The computer program product of claim 9, further comprising clearing all metadata in the cache.

15. The computer program product of claim 14, wherein clearing all metadata in the cache comprises writing zeros to any cache entry having the metadata indicator set.

16. The computer program product of claim 9, wherein the cache entries each further include a thread indicator that stores an indicator of a thread associated with metadata stored in the data portion of the cache entry.

17. A computer system comprising:
one or more processors; and
physical memory including a first physical memory storing actual data and a second physical memory in which a cache is implemented for caching the actual data as well as metadata to the actual data, the cache being configured to enable actual data and metadata to actual data to be stored within the same data portions of cache entries, the cache comprising:
a plurality of cache entries, each cache entry including:
a data portion that stores either actual data or metadata to actual data;

an address indicator that stores a representation of a physical address corresponding to the actual data or metadata stored in the data portion; and a metadata indicator that defines whether the data portion stores actual data that is stored at the physical address defined by the representation in the address indicator, or whether the data portion stores metadata to the actual data that is stored at the physical address defined by the representation in the address indicator.

* * * * *